United States Patent [19]

Farkas

[11] Patent Number: 4,947,795
[45] Date of Patent: Aug. 14, 1990

[54] BARKING CONTROL DEVICE AND METHOD

[75] Inventor: Gregory J. Farkas, Tucson, Ariz.

[73] Assignee: Tri-Tronics Inc., Tucson, Ariz.

[21] Appl. No.: 374,287

[22] Filed: Jun. 29, 1989

[51] Int. Cl.⁵ .............................................. A61N 1/00
[52] U.S. Cl. ....................................................... 119/29
[58] Field of Search ........................... 119/29, 96, 106; 340/573

[56] References Cited

U.S. PATENT DOCUMENTS

| | | | |
|---|---|---|---|
| 3,589,337 | 6/1971 | Doss | 119/29 |
| 3,608,524 | 9/1971 | Waltz | 119/29 |
| 3,673,567 | 6/1972 | McClellan, Sr. | 119/29 |
| 4,202,293 | 5/1980 | Gonda et al. | 119/29 |
| 4,524,773 | 6/1985 | Fischell et al. | 128/419 |
| 4,539,937 | 9/1985 | Workman | 119/29 |
| 4,802,482 | 2/1989 | Gonda et al. | 119/29 |

Primary Examiner—Gene Mancene
Assistant Examiner—R. Thomas Price
Attorney, Agent, or Firm—Cahill, Sutton & Thomas

[57] ABSTRACT

A bark trainer which allows a dog by its own barking behavior to control a level of electroshock stimulus. Circuitry in a collar-mounted electrical shock device detects the onset of barking and initially produces only a single low stimulus electrical shock pulse that gets the dog's attention, but does not produce a highly unpleasant level of stimulation. If the dog continues barking, the stimulation level of the electrical shock pulses are increased at the onset of each barking episode in a stepwise fashion until the stimulus becomes so unpleasant that the dog stops barking for at least a predetermined time, e.g., one minute. After that minute elapses, the circuitry resets itself to its lowest initial stimultion level and remains inactive until barking begins again, and then repeats the process, beginning with the lowest level of stimulation and increasing the stimulus level if barking continues. In one embodiment, a certain duration, i.e., 30 seconds, of "watchdog barking" is permitted before the initial stimulus pulse is applied to get the dog's attention, after which continued "nuisance barking" results in gradual increasing in the intensity of the adverse stimulus up to a maximum level until barking stops for at leasts one minute.

23 Claims, 3 Drawing Sheets

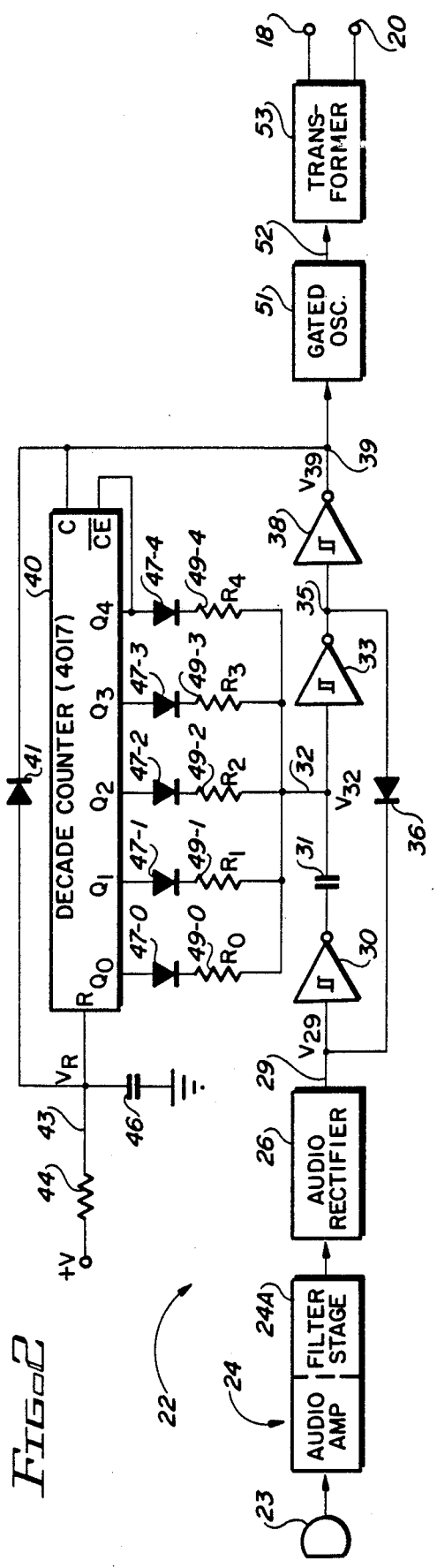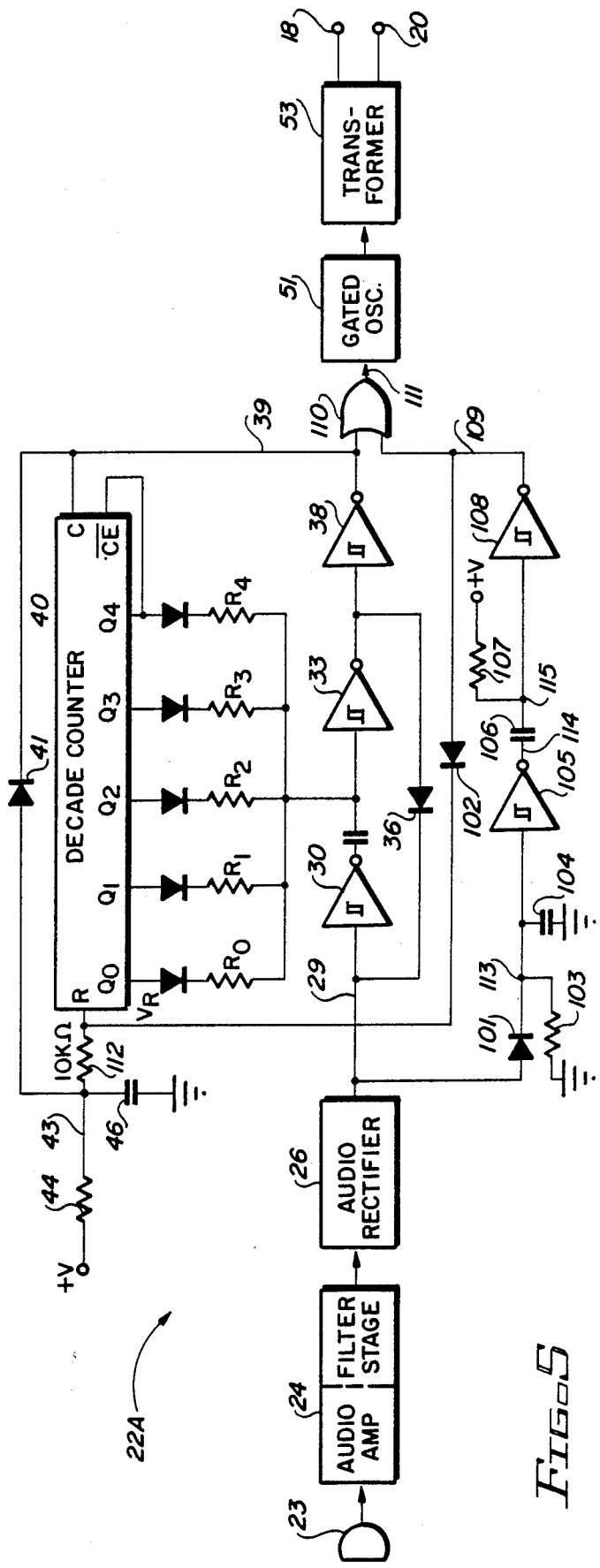

BARKING CONTROL DEVICE AND METHOD

BACKGROUND OF THE INVENTION

A variety of electronic dog training collars have been utilized for applying electrical shock and/or audible stimulus to a dog when it barks. In many situations it is highly desirable to prevent individual dogs or groups of dogs from barking excessively. For example, one dog's barking in a kennel is likely to stimulate other dogs to bark. This is undesirable with respect to the welfare of the dogs themselves and nearby personnel. Similar problems occur in neighborhoods in which there are dogs that are kept outside at night: if one dog starts barking others are likely to join in, causing a general disturbance.

The closest known prior "bark trainer" devices typically generate electrical shock signals and/or audible stimulus and apply them immediately to the dog when barking begins, because in accordance with the psychological theory of aversive training, a very unpleasant stimulus should be provided immediately in response to undesired behavior. This has been widely accepted as the best approach to aversive training. The present state-of-the-art for bark trainers is exemplified by commonly assigned U.S. Pat. No. 4,202,293 (Gonda et al May 13, 1980) (incorporated herein by reference) and U.S. Pat. No. 3,608,524 (Waltz, Sept. 28, 1971). Both of these references disclose bark trainers that apply electric shock and/or audible stimulus to a dog in response to the onset of its barking to provide a safe, humane device that limits the stimulus in order to prevent excessive discomfort to the dog. Other known prior bark trainers which operate in a manner that departs from the above-mentioned theory of aversive training have been found to become ineffective as soon as the dog gets used to the relatively mild stimulus produced thereby. With prior bark trainers that utilize aversive stimulus, there is a need to choose the level of that stimulus in accordance with the temperament of the particular dog to be trained. The stimulus needs to be great enough to prevent continued undesired behavior, but must not be so great as to overwhelm the dog or cause it to panic. Many of the prior bark trainers of the aversive stimulus type do not provide for any adjustment of the aversive stimulus level. Other prior devices of this kind do provide for adjustment of the aversive stimulus level, but time-consuming trial and error adjustment procedures in accordance with the dog's temperament in the present surroundings are necessary. Even after such adjustments are made, a change of circumstance or environment may render the previous aversive stimulus adjustment ineffective. Furthermore, most of the prior bark trainers that supply enough aversive stimulus to be effective over a long period of time often have the additional undesirable effect of overly subduing or intimidating the dog or causing fear or confusion.

There remains a need for an improved bark trainer device and method that are more effective than prior devices in training dogs to stop undesired barking.

In some cases, training of dogs to refrain from barking is inconsistent with the desirability of a limited amount of "watchdog barking". Up to now, there has been no training apparatus and associated method which allows or encourages initial watchdog barking, yet discourages excessive undesirable or nuisance barking.

There remains an unmet need for an improved bark trainer and method that eliminates prolonged unwanted barking without discouraging desirable watchdog barking, wherein an appropriate amount of barking at an intruder or other source of danger recognized by the dog is not discouraged.

SUMMARY OF THE INVENTION

It is an object of the invention to provide an improved bark control device and method which allow a dog to control the level of aversive stimulus applied to the dog by its barking behavior.

It is another object of the invention to provide a bark trainer and method which avoid excessive stimulus that would tend to overly subdue or intimidate the dog.

It is another object of the invention to provide a bark trainer and method which avoid the need for manual adjustment of stimulus in accordance with the temperament and disposition of the dog.

It is another object of the invention to provide a bark trainer and method which avoid the need for manual adjustment of the stimulus because of changes in the present environment and/or circumstances in which the dog is to be trained.

It is another object of the invention to provide a bark trainer and method which accomplish effective barking control with the lowest stimulus level which can accomplish that objective for a particular dog under the then prevailing circumstances.

It is another object of the invention to provide a bark trainer and method which accomplish effective barking control without negatively affecting the spirit and style of the dog.

It is another object of the invention to provide a bark trainer device and method which discourage prolonged or excessive undesirable barking without discouraging a certain amount of desirable watchdog barking.

Briefly described, and in accordance with one embodiment thereof, the invention provides a bark trainer including a collar mounted electroshock device that detects the onset of barking and initially produces only a single very narrow, and hence low stimulus electroshock pulse that may be approximately 10,000 volts in amplitude but less than approximately one millisecond in duration. This single pulse initially gets the dog's attention, but does not produce a very unpleasant stimulus. However, if the dog continues barking, the number of such pulses increases gradually in stepwise fashion, thereby increasing the stimulation level until the electrical shock stimulus becomes so unpleasant that the dog stops barking. If the dog remains quiet for at least a predetermined period (e.g. one minute), the bark trainer of the present invention resets itself to its initial state, so the detected onset of further barking again produces only a single initial electrical shock pulse. Continued barking before another one minute interval elapses causes the bark trainer to repeat the above described process, beginning at the lowest levels of stimulation and gradually increasing the electrical shock stimulus level up to a maximum level if barking does not cease for at least the predetermined time interval.

In one described embodiment of the invention, the bark trainer allows the dog to bark for up to about 30 seconds before the first electrical shock stimulation pulse occurs, to thereby discourage prolonged "nuisance barking" but not discourage desirable "watchdog barking".

In another described embodiment of the invention, a selectable dual mode function is provided wherein a first mode allows the bark trainer to function either as a controlled stimulation device that immediately applies a low level of electrical shock stimulation upon the onset of barking to get the dog's attention, followed by gradual stepwise increases in electrical shock stimulation level if the dog continues barking. In a second mode the bark trainer functions as a watchdog bark trainer that allows the dog 30 seconds of "watchdog barking" before a first mild, attention-getting electrical shock pulse occurs, followed by gradual increases in the duration of the electrical shock pulses if barking continues. This device helps a dog trainer to teach the dog to bark discriminately under certain circumstances, and to encourage the dog to be silent under other conditions.

BRIEF DESCRIPTION OF THE DRAWINGS

FIG. 2 is a schematic diagram of the circuitry in the device of FIG. 1.

FIG. 5 is a diagram of an alternate embodiment of the invention.

DETAILED DESCRIPTION OF THE PREFERRED EMBODIMENTS

Figure 1:
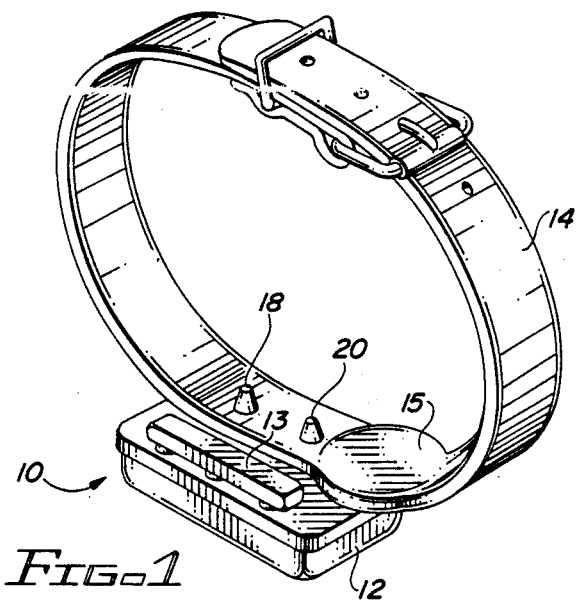
FIG. 1 is a perspective diagram illustrating the bark trainer of the present invention.

FIG. 1 indicates the structure of a bark trainer 10, in which a housing 12 contains the electrical shock and control circuitry shown in FIG. 2. The outputs of the electrical stimulus circuitry of FIG. 2 are connected to two partially insulated electrodes 18 and 20 which extend through a flexible collar 14 from the output terminals of the circuit of FIG. 2. Bare electrode tips of electrodes 18 and 20 protrude from cylindrical insulating collars and extend through the animal's fur to make electrical contact with the skin of the neck, so when the circuit of FIG. 2 responds to the onset and/or continuation of the dog's barking, the electrical shock stimulus levels applied by electrodes 18 and 20 are gradually incremented at the onset of each barking episode until barking abates. Numeral 13 designates a plug-in "turn on" element that can be unplugged to deactivate the bark trainer 10 and/or provide an electrical connection to recharge the enclosed batteries. A vibration transducer 15 is held against the dog's neck by the collar.

Referring now to FIG. 2, the electrical stimulus and control circuit 22 contained in housing 12 consists of vibration sensor 23, which can be a piezoelectric disk or other suitable microphone element that is more sensitive to large amplitude vibrations produced by the dog's barking than to extraneous airborne sounds such as another dog's barking. The electrical signal produced by microphone 23 in response to barking by the dog is fed into the input of an ordinary audio amplifier circuit 24 that contains an output filter stage 24 which is designed to filter out or discriminate against undesired triggering of the bark trainer 10 by various extraneous non-barking noises and/or vibrations.

The output of the filter section 24A of audio amplifier 24 is applied to the input of an audio rectifier circuit 26. Audio rectifier 26 simply converts the AC output of audio amplifier 24 into a positive-going step function pulse on conductor 29 in response to the onset of barking by the dog. Conductor 29 is applied to the input of an inverting Schmitt trigger 30, which can be a 74C14, available from various manufacturers. The output of inverting Schmitt trigger 30 is connected to one terminal of a 0.1 microfarad capacitor 31, the other terminal of which is connected by conductor 32 to the input of a second inverting Schmitt trigger 33 identical to the first one. The output of inverting Schmitt trigger 33 is connected by conductor 35 to the anode of a diode 36 and to the input of a third inverting Schmitt trigger 38, which also can be an 74C14. The cathode of diode 36 is connected to conductor 29.

Conductor 39 is connected to the input of gated oscillator circuit 51, which is a conventional enabled oscillator circuit with components selected to cause it to oscillate at 325 hertz when enabled by a low input level. Conductor 39 also is connected to the clock input of a decade counter 40, which can be a 4017 integrated circuit decade counter, available from various manufacturers. Conductor 39 also is connected to the cathode of diode 41, the anode of which is connected to conductor 43 and to the reset input of decade counter 40 and to one terminal of a 44 megohm resistor 44, the other terminal of which is connected to a +V conductor. +V can be 4.2 volts. Conductor 43 also is connected to one terminal of a one microfarad capacitor 46, the other terminal of which is connected to ground.

The five outputs $Q_0$, $Q_1$, $Q_2$, $Q_3$, and $Q_4$ of decade counter 40 are connected to the anodes of diodes 47-0, 47-1, 47-2, 47-3 and 47-4, respectively. The $Q_4$ conductor also is connected to the $\overline{CE}$ input of decade counter 40. When decade counter 40 is reset, $Q_0$ goes to a "1", and $Q_1$–$Q_4$ go to "0". Each time it is clocked, the presently "high" output goes to a "0" and the next output goes to a "1".

The cathodes of diodes 47-0, 47-1, 47-2, 47-3 and 47-4 are connected to one terminal of ten kilohm resistor 49-0 (R0), 56 kilohm resistor 49-1 (R1), 330 kilohm resistor 49-2 (R2), 1.8 megohm resistor 49-3 (R3), and 4.7 megohm resistor 49-4 (R4), respectively. The other terminal of each of those resistors is connected to conductor 32. Decade counter 40 thus selects one of the resistors 49-0 through 49-4 at a time to be operatively connected in series with capacitor 31 to determine how long the latch circuit including Schmitt triggers 30 and 33, diode 36 and capacitor 31 remains set.

The output of gated oscillator 51 is connected by conductor 52 to a primary winding of transformer 53. The terminals of a secondary winding of transformer 53 are connected to electrodes 18 and 20.

Figure 4:
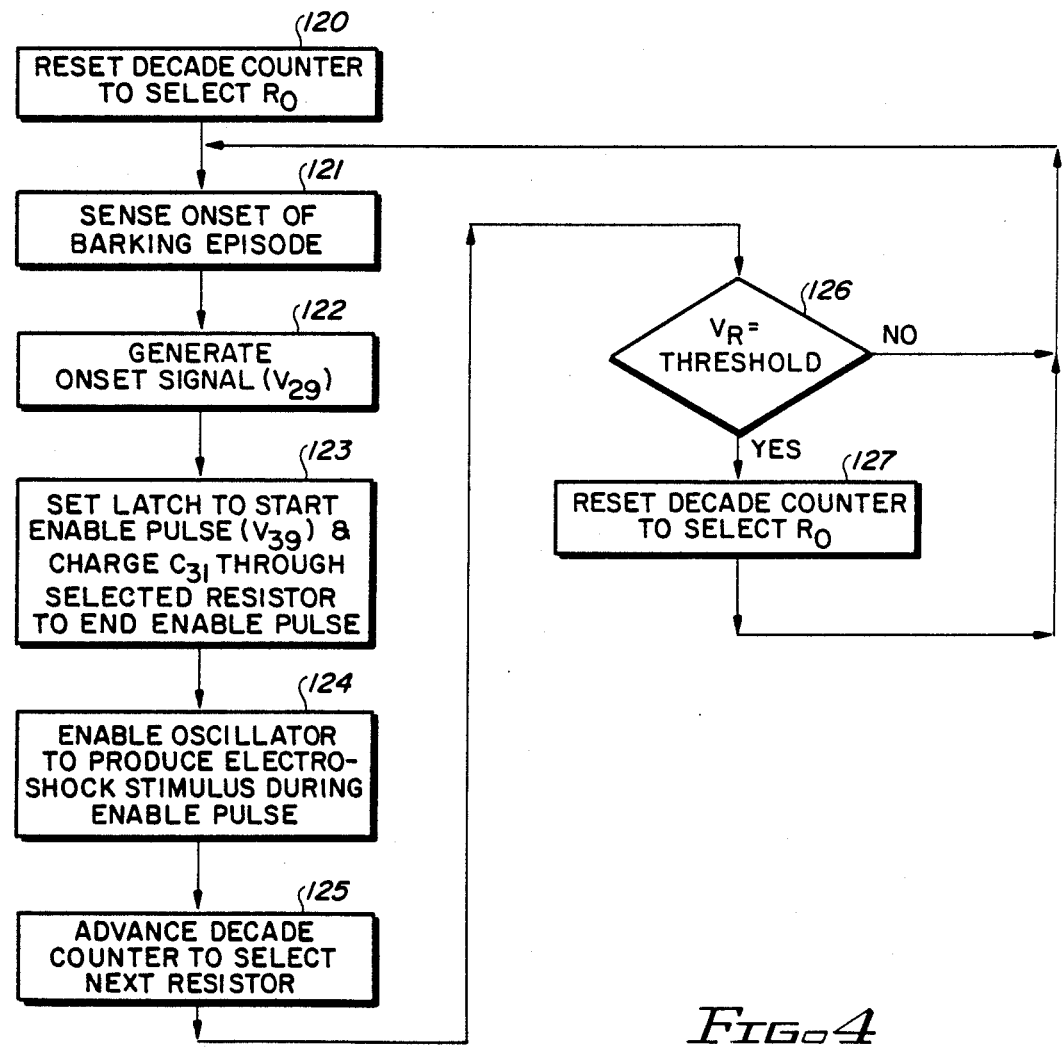
FIG. 4 is a flow chart outlining the operation of the bark trainer of the present invention.
Figure 3:
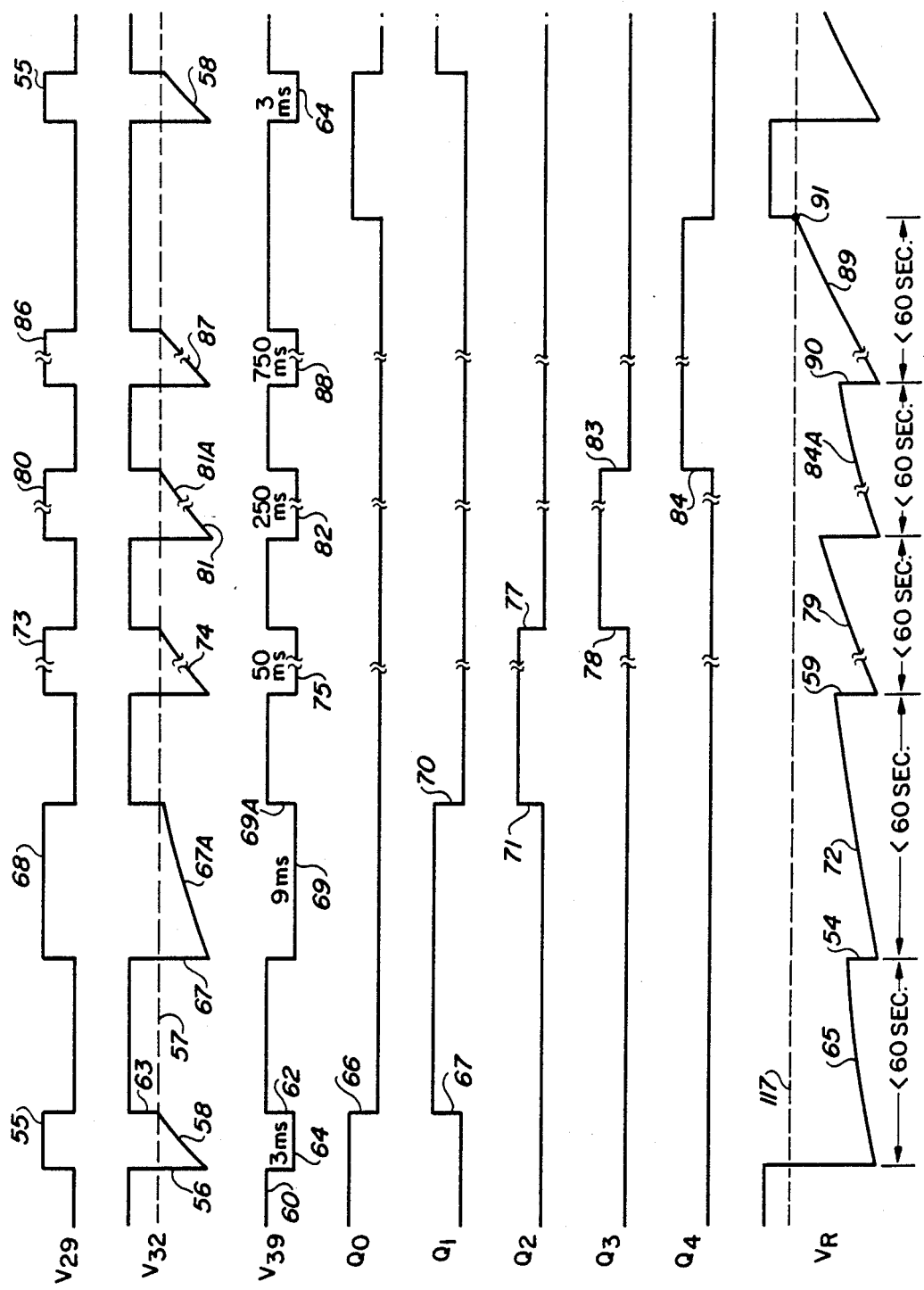
FIG. 3 is a timing diagram illustrating the operation of a circuit of FIG. 2.

The operation now will be described with reference to the timing diagram of FIG. 3 and the flowchart of FIG. 4. FIG. 3 shows various node voltages of the circuit of FIG. 2 during a hypothetical sequence of barking episodes. FIG. 4 indicates the general operation of the circuit of FIG. 2. It should be understood that initially, when power is first applied to circuit 22 of FIG. 2, decade counter 40 will be reset, as indicated in block 120 of FIG. 4, so that $Q_0$ is equal to a "1" when capacitor 46 is charged up through resistor 44. Whenever decade counter 40 is reset, $Q_0$ is set to a "1" and $Q_1$–$Q_4$ are reset to "0", so only R0 is "selected".

When a pulse 55 of $V_{29}$ is received on conductor 29 from audio rectifier 26 in response to onset of an initial episode of barking, as indicated by block 122 of FIG. 4, the first inverting Schmitt trigger 30 is triggered, so that a negative transition is produced on the left terminal of capacitor 31. Block 121 of FIG. 4 indicates this step of the operation of the circuit of FIG. 2. Capacitor 31 is so large that the initial voltage drop across it is essentially zero, so the voltage $V_{32}$ on conductor 32 rapidly falls from $+V$ to ground, as indicated by transition 56. This causes the output of Schmitt trigger 33 on conductor 35 to rapidly rise to about $+V$ volts.

This voltage rise on conductor 35 is fed back through diode 36 to the input of Schmitt trigger 30, so that the latch circuit including inverting Schmitt triggers 30 and 33 is latched in its present state until the 0.1 microfarad capacitor 31 is charged, as indicated by transition 58 of $V_{32}$ through resistor 49-0 to the threshold 57 of inverting Schmitt trigger 33.

The above-mentioned rise in voltage on conductor 35 also produces a falling transition 60 of $V_{39}$. The low signal level of pulse 64 of $V_{39}$ produced by inverting Schmitt trigger 38 serves as an oscillator enable signal that is applied to the input of gated oscillator circuit 51. When transition 58 of $V_{32}$ reaches threshold level 57, the latch circuit switches, producing transition 62 of $V_{39}$, ending oscillator enable pulse 64 after approximately 3 milliseconds, as indicated by block 123 of FIG. 4. The positive-going transition 62 of $V_{39}$ clocks decade counter 40, causing $Q_0$ to undergo transition 66 to ground and causing $Q_1$ to undergo transition 67 to $+V$. This advances decade counter 40 to select R1, as generally indicated in block 125 of FIG. 4.

The width of the oscillator enable pulse 64 of $V_{39}$ is approximately 3 milliseconds. This is long enough to enable one pulse of the 325 Hertz signal produced by gated oscillator circuit 51. The resulting pulse produced on conductor 52 by gated oscillator circuit 51 produces an electrical stimulus signal of less than approximately one millisecond duration and of about 10,000 volts in amplitude to be produced between electrodes 18 and 20 and applied to the skin of the dog's neck. Block 124 of FIG. 4 generally indicates the enabling of oscillator 51 by the enable pulse.

In the present hypothetical example, the onset of the next barking episode produces pulse 68 of $V_{29}$ less than 60 seconds before the onset of barking that produced pulse 55 of $V_{29}$. Consequently, the transition 65 of reset voltage $V_R$ does not rise enough to reset decade counter 40. Decision block 126 of FIG. 4 generally indicates the determination, which in this case results in a "no" decision before the next onset pulse 68.

The leading edge of pulse 68 results in a negative-going transition 54 of $V_R$, pulling it back down to ground. The leading edge of pulse 68 also produces pulse 67 of $V_{32}$ and pulse 69 of $V_{39}$ in the manner described above. Capacitor 31 is charged through resistor 49-1 at a substantially slower rate indicated by the slope of transition 67A of $V_{32}$. When $V_{32}$ reaches threshold 57, the above-mentioned latch again switches, producing transition 69A of $V_{39}$, such that the width of pulse 69 of oscillator enable voltage $V_{69}$ is approximately 9 milliseconds, hence increasing the number of 325 Hertz 5,000 to 10,000 volt peak-to-peak cycles applied through electrodes 18 and 20 to the dog's neck, and hence substantially increasing the perceived stimulus level. Transition 69A of $V_{39}$ reaches threshold 57, causing negative-going transition 70 of $Q_1$ and positive-going transition 71 of $Q_2$.

Resistor 44 continues to charge capacitor 46, as indicated by slope 72 of $V_R$, but the onset of the next episode of barking occurs less than 60 seconds after the leading edge of pulse 68, so a third pulse 73 is produced on $V_{29}$, producing pulse 74 of $V_{32}$ and pulse 75 of $V_{39}$, and also producing transition 59 of $V_R$ before decade counter 40 is reset. During pulse 73, resistor 49-2 charges capacitor 31, producing transition 74 of $V_{32}$, causing the width of pulse 75 of oscillator enable signal $V_{69}$ to be approximately 50 milliseconds, thereby still further increasing the stimulus level.

The trailing edge of pulse 75 of oscillator enable signal $V_{69}$ clocks decade counter 40, producing transition 77 of $Q_2$ and transition 78 of $Q_3$, thereby selecting resistor 49-3.

The onset of the next episode of barking produces pulse 80 of $V_{29}$, which produces pulse 81 of $V_{32}$ and pulse 82 of $V_{39}$. Capacitor 31 is charged through Resistor 49-3, producing pulse 81 of $V_{32}$. The trailing edge of pulse 82 clocks decade counter 40 so that $Q_3$ goes to a "0", and $Q_4$ goes to a "1". This time, approximately 250 milliseconds are required to charge capacitor 31, as indicated by the slope of transition 81A of pulse 81 of $V_{32}$ thereby determining the width of pulse 82 of $V_{39}$ to be 250 milliseconds. The trailing edge of pulse 82 causes transition 83 of $Q_3$ and the positive transition 84 of $Q_4$.

The onset of the next episode of barking produces pulse 86 of $V_{29}$, and pulls $V_R$ back to ground as indicated by transition 90. This time capacitor 31 is charged through resistor 49-4 to produce transition 87 of $V_{32}$, causing the width of pulse 88 of $V_{39}$ to be approximately 750 milliseconds. This time, however, the onset of the next barking episode occurs more than 60 seconds after the onset of the previous episode, resulting in a "yes" decision in block 126 of FIG. 4. Since resistor 44 continued to charge capacitor 46, as indicated by transition 89, all the way to the reset threshold of decade counter 40. At the time indicated by numeral 91, $V_R$ resets decade counter 40, as indicated in block 127 of FIG. 4, so that $Q_0$ again equals "1" and $Q_4$ goes to "0". The above-described process then is repeated for following barking episodes.

The above described bark trainer operates on the basis of a recognition that every dog's reason for barking is different. The new bark trainer makes it possible to train a dog to limit its barking using a method that is easy to learn and is acceptable to that dog, without damaging the dog's spirit and style while it is learning when it is appropriate to bark and when it is appropriate to be silent.

The results of testing of the above described bark trainer have been surprising, because it has been found that most dogs learn to stop barking after receiving only the initial "reminder" electrical shock stimulus pulse. In comparative testing of the bark trainer of the present invention with prior art bark trainers, it has been found that better non-barking behavior by the dog is achieved, and the dog is much more relaxed, as a result of having not been subjected to more intense levels of stimulation, and perhaps also as a result of the dog having been in control of the level of stimulus. The described invention avoids the need for manual adjustment of intensity levels for the electrical shock stimulation, since the dog's behavior automatically establishes the stimulation levels. Another benefit of the invention is the negligible effect of accidental stimulation, as the initial "reminder" pulse, being relatively non-aversive and of minimum intensity, is well tolerated by the dog even in accidental or "unfair" stimulus occurrences.

Referring to FIG. 5, the circuit 22A is similar to the bark trainer circuit 22 of FIG. 2 except that additional circuitry has been added to provide a 30 second period of "watchdog barking" before the initial stimulus pulse is produced in the manner described above with reference to FIG. 3. In FIG. 5, additional circuitry including diode 101, resistor 103, capacitor 104, inverting Schmitt trigger 105, capacitor 106, resistor 107, inverting Schmitt trigger 108, OR gate 110, diode 102, and resistor 112 operates to provide a 30 second initial delay. Diode 101 has its anode connected to conductor 29 and its cathode connected by conductor 113 to the input of Schmitt trigger 105 and to one terminal of each of 44 megohm resistor 103 and one microfarad capacitor 104, the other terminals of which are connected to ground.

The output of Schmitt trigger 105 is connected by conductor 114 to one terminal of one microfarad capacitor 106, the other terminal of which is connected by conductor 115 to a 22 megohm resistor 107 and to the input of Schmitt trigger 108. The output of Schmitt trigger 108 is connected by conductor 109 to one input of OR gate 110 and to the anode of diode 102. The other input of OR gate 110 is connected to conductor 39 and the output of OR gate 110 is connected by conductor 111 to the enable input of gated oscillator circuit 51. The cathode of diode 102 is connected to the R input of decade counter 40 and to one terminal of 10 kilohm resistor 112, the other terminal of which is connected by conductor 43 to resistor 44, capacitor 46, and the anode of diode 41. Resistor 112 isolates the output of Schmitt trigger 108 from the output of Schmitt trigger 38. The other components of FIG. 5 are connected precisely as in FIG. 2.

Figure 6:
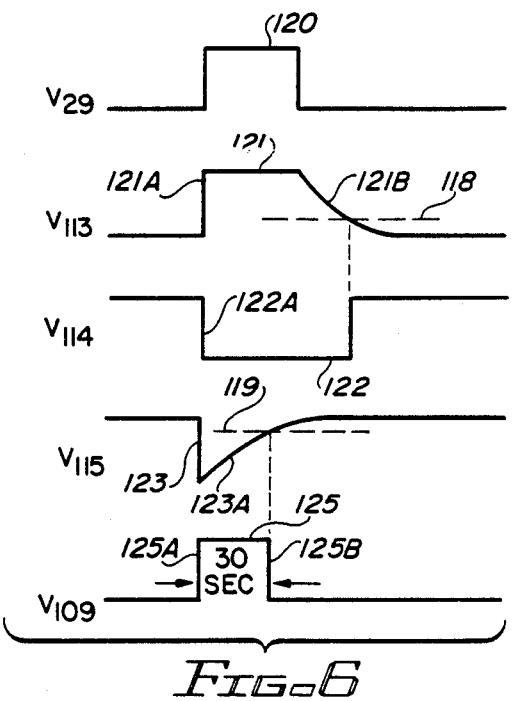
FIG. 6 is a timing diagram useful in explaining the operation of the embodiment of FIG. 5.

It will be helpful to refer to the timing diagram of FIG. 6 in explaining the operation of the circuit of FIG. 5. Assume that the dog's initial bark produces pulse 120 of $V_{29}$. The leading edge of pulse 120 is coupled across diode 101 and produces the leading edge 121A of pulse 121 of $V_{113}$. Pulse 120 thereby charges capacitor 104 to $+V$, producing the level shown at the top of pulse 121. After the trailing edge of pulse 120, diode 101 becomes reverse biased and capacitor 104 is discharged through resistor 103 with a time constant of approximately 60 seconds, as indicated by transition 121B.

The leading edge 121A of $V_{113}$ causes Schmitt trigger 105 to switch, producing transition 122A of $V_{114}$. $V_{114}$ stays at ground until $V_{113}$ is discharged to the threshold voltage 118 of Schmitt trigger 105, which takes about 60 seconds if no further barking occurs.

As soon as $V_{114}$ goes low, $V_{115}$ undergoes transition 123 to ground and 22 megohm resistor 107 begins charging capacitor 106 until $V_{115}$ reaches the threshold voltage 119 of Schmitt trigger 108, as indicated by transition 123A of $V_{115}$. Transition 123 of $V_{115}$ causes the voltage on conductor 109 to undergo transition 125A of a 30 second pulse 125 on conductor 109 because the time constant of the RC circuit 107,106 is approximately 30 seconds. The pulse 125 acts as a 30 second inhibit signal which prevents the oscillator enable signal $V_{39}$ of FIG. 3 from reaching the input conductor 111 of gated oscillator 51.

The pulse 125 on conductor 109 also is fed forward to diode 102 to hold decade counter 40 in the reset mode during the 30 second watchdog barking interval to prevent ongoing barking from advancing decade counter 40, so that the first oscillator enable signal produced on conductor 39 after the end of the 30 second watchdog barking period will be the 3 millisecond pulse 64 on conductor 39 as previously described with reference to FIG. 3.

The onset of any additional barking episodes before capacitor 104 gets discharged through resistor 103 to the threshold of Schmitt trigger 105 recharges capacitor 104 and restarts the 60 second time delay, so that the dog does not get another "free" 30 second watchdog barking period until it has abstained from barking for at least 60 seconds.

The embodiment of FIG. 5 helps a trainer to teach a dog to perform desired watchdog barking discriminately under certain circumstances, and to be quiet under other circumstances.

While the invention has been described with reference to a particular embodiment thereof, those skilled in the art will be able to make various modifications to the described embodiment without departing from the true spirit and scope of the invention.

What is claimed is:

1. A method of control of barking by a dog, comprising the steps of:
    (a) sensing a barking episode by the dog;
    (b) producing and applying to the dog an electroshock stimulus of a low initial intensity which is sufficient to get the dog's attention, in response to the sensing of step (a);
    (c) continuing to sense any further barking episodes by the dog, and if other barking episodes occur, each before a preselected time interval elapses, then producing further electroshock stimulus in response to each episode, respectively, whereby the intensity of each further electroshock stimulus is increased in accordance with the number of the further barking episodes;
    (d) repeating steps (a) through (c) if no other barking episode occurs before the preselected time interval elapses.

2. The method of claim 1 wherein step (a) includes sensing an onset of the barking episode, step (c) includes sensing onsets of the further barking episodes and producing the further electroshock stimulus in response to each onset, and step (d) includes repeating step (a) through (c) if no onset of another barking episode occurs before the preselected time interval elapses.

3. The method of claim 2 wherein step (a) includes pressing a vibration sensitive transducer against the dog's neck by means of a collar, amplifying and rectifying a signal produced by the transducer to produce a plurality of onset signals that represent the onsets of the barking episodes, respectively, and applying the electroshock stimulus to the dog's neck by means of a pair of electrodes pressed against the neck by the collar.

4. The method of claim 3 including starting a first timing circuit in response to one of the onset signals, producing an enable signal having a width equal to a time interval determined by the first timing circuit, and causing the electroshock stimulus to have a duration corresponding to the width of the enable signal.

5. The method of claim 4 including increasing the time interval determined by the first timing circuit and starting a second timing circuit in response to initiation of the enable signal, the second timing circuit determining the preselected time interval.

6. The method of claim 5 wherein the increasing of the time interval of the first timing circuit includes incrementing a decade counter circuit having a plurality of outputs connected by a plurality of diodes to a first terminal of each of a plurality of resistors, respectively, in response to termination of the enable signal, each of the resistors having a second terminal connected to a capacitor in the first timing circuit to determine a corresponding time interval of the first timing circuit.

7. The method of claim 6 including enabling an oscillator in response to the enable signal and driving a primary winding of a transformer with the oscillator, and coupling a secondary winding of the transformer to the electrodes.

8. The method of claim 7 including generating a free barking interval before producing the initial intensity electroshock stimulus, by producing an inhibit signal in response to an initial onset of barking and inhibiting the enable signal from the oscillator by means of a gate that performs a logical ANDing of the enable signal with the inhibit signal to produce an oscillator enable signal.

9. An apparatus for control of barking by a dog, comprising in combination:
 (a) means for sensing a barking episode by the dog;
 (b) means coupled to the sensing means for producing an initial, low intensity electroshock stimulus of an initial intensity which is sufficient to get the dog's attention in response to the barking episode;
 (c) means for applying the electroshock stimulus to the dog;
 (d) means for producing further electroshock stimulus in response to a further barking episode if the further barking episode occurs before a preselected time interval elapses;
 (e) means for increasing the intensity of the further electroshock stimulus in accordance with a number of occurrences of further barking episodes;
 (f) means for reducing the intensity of the electroshock stimulus to the initial intensity if no other barking episode occurs before the preselected time interval elapses.

10. The apparatus of claim 9 wherein the sensing means senses an onset of the barking episode, the initial electroshock stimulus producing means responds to the onset of the barking episode, the further electroshock stimulus producing means responds to an onset of the further barking episode, and the intensity reducing means reduces the intensity if no onset of another barking episode occurs before the preselected time interval elapses.

11. The apparatus of claim 10 including a vibration sensitive transducer and a collar pressing the vibration sensitive transducer against the dog's neck, wherein the electroshock stimulus producing means includes first and second electrodes pressed by the collar against the dog's neck and applying the electrode stimulus to the dog's neck, means for amplifying, filtering, and rectifying a signal produced by the transducer to produce a plurality of onset signals that represent the onsets of the barking episodes, respectively.

12. The apparatus of claim 11 including a first timing circuit, and means for starting the first timing circuit in response to the onset signals, means coupled to the first timing circuit for producing an enable signal having a width equal to a time interval determined by the first timing circuit, and means responsive to the enable signal for producing the electroshock signal with a duration corresponding to the width of the enable signal.

13. The apparatus of claim 12 including means for increasing the interval determined by the first timing circuit, a second timing circuit determining a preselected time interval, and means coupled to the second timing circuit for starting the preselected time interval in response to initiation of the enable signal.

14. The apparatus of claim 13 wherein the time interval increasing means includes a decade counter circuit having a plurality of outputs connected by a plurality of diodes to a first terminal of each of a plurality of resistors, respectively, each of the resistors having a second terminal connected to a first terminal of a first capacitor in the first timing circuit to determine a corresponding time interval of the first delay circuit, and means for incrementing the decade counter circuit in response to termination of the enable signal.

15. The apparatus of claim 13 wherein the electroshock stimulus producing means further includes an oscillator having an enable input connected to respond to the enable signal, an output transformer having a primary winding connected to an output of the oscillator, and a secondary winding having terminals connected to the first and second electrodes, respectively.

16. The apparatus of claim 15 wherein the first timing circuit includes a first inverting Schmitt trigger having an input connected to receive the onset signals, an output connected to a second terminal of the first capacitor, a second inverting Schmitt trigger having an input connected to the first terminal of the first capacitor and to the resistors and an output connected by means of a diode to the input of the first inverting Schmitt trigger, and an input of a third inverting Schmitt trigger, the third Schmitt trigger having an output and producing the enable signal on that output.

17. The apparatus of claim 16 wherein the second timing circuit includes a second capacitor having a first terminal coupled to ground and a second terminal coupled to a reset input of the decade counter, to a first terminal of a pullup resistor, and to an anode of a diode having a cathode coupled to a clock input of the decade counter and the output of the third inverting Schmitt trigger.

18. The apparatus of claim 17 including five of the resistors, wherein the decade counter has five outputs connected, respectively, to the resistors, the resistors and the first capacitor having resistances and a capacitance, respectively, selected to produce corresponding time intervals of approximately 3, 9, 50, 250, and 750 microseconds after each incrementing of the decade counter.

19. The apparatus of claim 18 wherein the pullup resistor and the second capacitor have values selected to cause the preselected time interval to be approximately one minute.

20. The apparatus of claim 18 including means coupled to the enable input of the oscillator for generating a free barking interval in response to an initial barking episode before producing the initial intensity electroshock stimulus.

21. The apparatus of claim 20 wherein the free barking interval generating means includes a third timing circuit, means for starting the third timing circuit in response to an onset of the initial barking episode, means responsive to the third timing circuit for producing an inhibit signal of a duration corresponding to the free barking interval, an inhibit gate having inputs connected to receive the enable signal and the inhibit signal, respectively, and an output connected to the enable input of the oscillator, and means for holding the decade counter in its reset mode in response to the inhibit signal to prevent onsets of barking episodes from incrementing the decade counter during the free barking interval.

22. The apparatus of claim 21 wherein the means for starting the third timing circuit includes a fourth timing circuit producing a time delay interval which prevents the means responsive to the third timing means from generating another inhibit signal until the dog has abstained from barking for a period of time equal to the time delay interval.

23. An apparatus for control of barking by a dog, comprising in combination:
(a) means for sensing a barking episode by the dog;
(b) means coupled to the sensing means for producing an initial, low intensity electroshock stimulus of an initial intensity which is sufficient to get the dog's attention in response to the barking episode;
(c) means for applying the electroshock stimulus to the dog;
(d) means for producing further electroshock stimulus in response to a further barking episode if the further barking episode occurs before a preselected time interval elapses;
(e) means for increasing the intensity of the further electroshock stimulus in accordance with a number of occurrences of further barking episodes;
(f) means for reducing the intensity of the electroshock stimulus to the initial intensity if no other barking episode occurs before the preselected time interval elapses;
(g) means coupled to the electroshock stimulus producing means for producing an inhibit signal in response to an initial barking episode;
(h) means responsive to the inhibit signal for inhibiting the electroshock stimulus producing means from producing the initial intensity electroshock stimulus until the inhibit signal has terminated, thereby generating a free barking interval followed by electroshock stimulus produced in response to further barking episodes.

* * * * *